Patented Nov. 6, 1923.

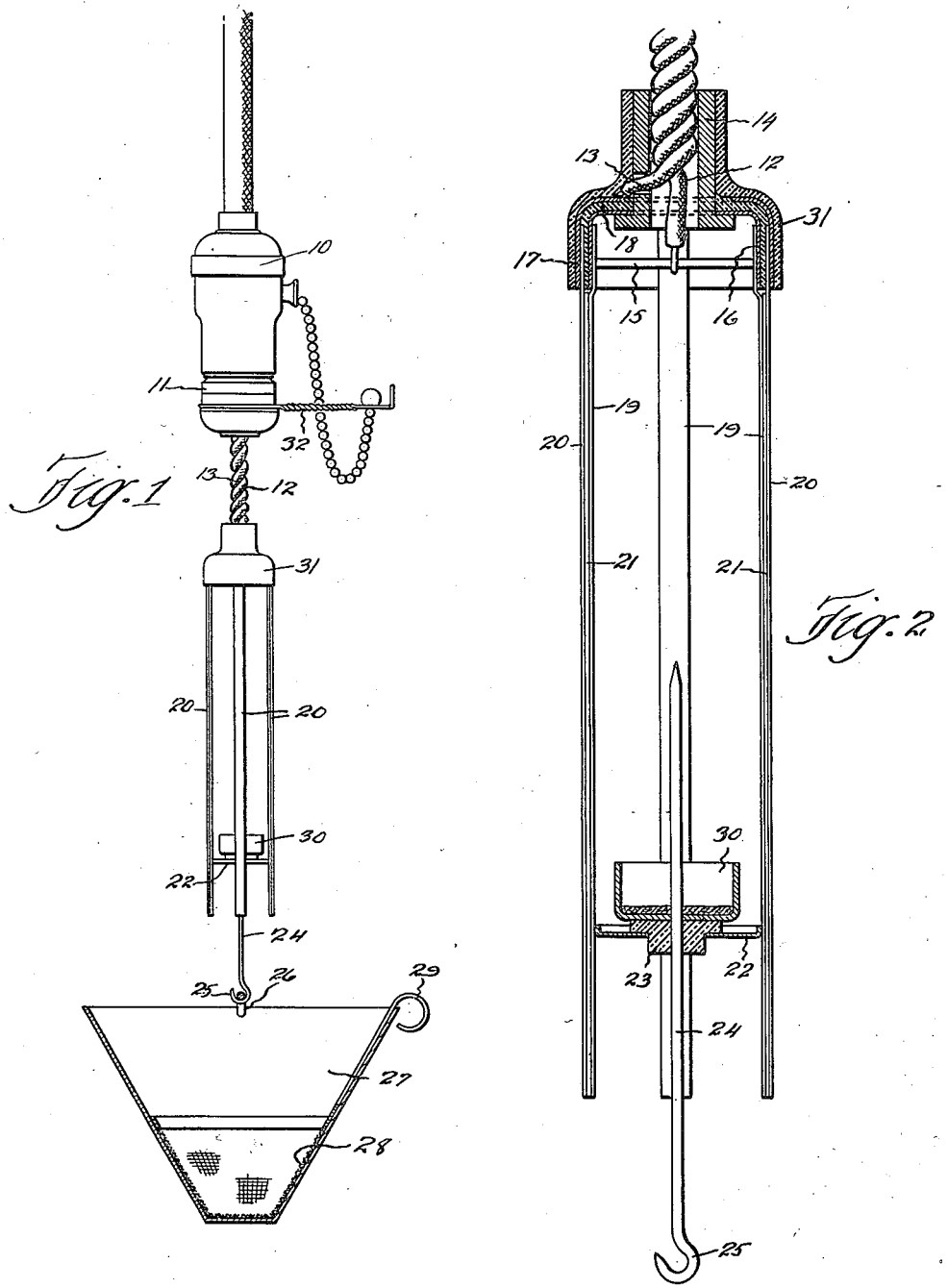

1,473,535

UNITED STATES PATENT OFFICE.

HUGH ALEXANDER, OF CLEVELAND, OHIO.

INSECT EXTERMINATOR.

Application filed February 13, 1922. Serial No. 536,192.

*To all whom it may concern:*

Be it known that I, HUGH ALEXANDER, a subject of the King of Great Britain, who has certified his intention of becoming an American citizen, residing at Cleveland, in the county of Cuyahoga and State of Ohio, have invented a certain new and useful Improvement in Insect Exterminators, of which the following is a full, clear, and exact description, reference being had to the accompanying drawings.

This invention is a novel construction of insect exterminator particularly adapted for collecting and killing flies, although it is equally as well adapted for killing other insects.

The object of the invention is to provide an electrical insect exterminating device which shall be exceedingly cheap and simple in construction, efficient and clean in operation or use, and one which though electrically operated will be inexpensive so far as cost of current is concerned, inasmuch as an infinitely small amount of current is used for an exceedingly short period of time, and although the device is constantly energized, only a small amount of current is used; for the instant that an insect lights thereon and receives the shock which stuns it, it drops down into the killing solution.

Another object of the invention is to provide a device which can be suspended from an ordinary incandescent lamp socket, and which will be neat and attractive in appearance; and another object is to provide a device embodying these general characteristics in which various kinds of bait can be employed; or the bait entirely dispensed with if desired.

With these various objects in view the invention consists generally in providing at least a pair of conductors which are in constant connection with a source of electric energy, which conductors are so sized and spaced that an insect, such as a fly, lighting thereon will close the circuit through its body and the current passing therethrough will either kill or stun the insect and it will at once drop.

The invention consists also in arranging a receptacle below the electric stunning device, which receptacle contains an exterminating solution so that when the fly drops into the same it will be killed, if it be not already dead.

The invention consists also in certain details of construction, and in the manner of combining or arranging the same, all of which will be fully described hereinafter and pointed out in the claims.

In the drawings forming a part of this specification, Fig. 1 is a side elevation of a device embodying one form of my invention the insect catching receptacle being shown in section and Fig. 2 is an enlarged sectional view of the electrical portion of the device.

Referring to the drawings 10 indicates an ordinary electric light socket into which is screwed the plug 11, which is preferably of the separable kind; and leading from this plug 11 are the conductor wires 12 and 13, the wire 12 passing centrally through an insulating bushing 14 and connected to a metallic cross bar 15 which is attached to an inner band or ring 16. The wire 13 passes laterally through the bushing 14 and is connected to an outer band or ring 17, and these inner and outer bands or rings are insulated from each other by an insulating sleeve 18 of any suitable material. Depending from the inner and outer bands or rings are the thin narrow conductor strips 19 and 20 which may be of any desired length, preferably six or eight inches. These thin narrow conductor strips are insulated from each other from end to end by a strip of insulating material 21, preferably asbestos, and in practice I prefer to employ at least four pairs of conductor strips attached to the bands or rings and grouped as shown. Near their lower ends these strips are connected to a disk 22 in which is located a fiber bushing 23 and through which the bait spear 24 is passed, the upper end thereof being pointed so that the bait can be easily fixed thereon, and the lower end is turned into a hook 25 on which is hung the cross bail 26 of the liquid holding receptacle 27 which may be of any size or shape desired; and in the bottom receptacle I prefer to place a foraminous scoop 28, preferably of wire gauze and having a handle 29 which extends up to and over the edge of the receptacle. This scoop 28 fits in the lowermost part of the receptacle and by means of it all the flies can be removed without the necessity of removing the killing solution and also avoiding the necessity of detaching the receptacle although this could be done if so desired. The bait spear is also preferably surrounded by a small shallow pan 30 faced with felt. The outer band 17 and upper portion of the conductor strips are protected by a rubber covering 31 which will prevent any one getting a shock.

In case a pull chain socket is employed I provide a chain holding arm 32 made of wire and attached to the plug and bifurcated at its outer end to receive the chain therein and hold the same away from the conductors.

Any suitable bait such as a piece of banana may be employed upon the spear or any liquid such as milk may be placed in the pan. In the receptacle I place a sufficient quantity of water and add thereto three or four drops of lysol. This I have found to be sufficient to instantly kill flies and it has the advantage of being a disinfecting agent.

When the device is suspended from a socket the current is turned on, and the conductors will be energized. A fly, attracted by the bait, will first light upon one set of conductors and completing the circuit through the body will immediately receive a shock sufficient to stun it, if not to kill and being stunned it drops into the receptacle and the lysol solution immediately finishes the exterminating process.

When a quantity have been killed the foraminous scoop is lifted out and emptied and replaced. The device is effective and is clean and sanitary. It can be suspended from an ordinary incandescent lamp socket and will not consume enough current to be noticed at the meter.

Having thus described my invention, what I claim is:

1. In an insect exterminator, an electric stunning device, a liquid containing receptacle arranged beneath the same, and a foraminous scoop contained within said receptacle.

2. The combination with a pair of bands and a plurality of pairs of conductors connected to said bands, said bands and conductors being insulated, of electric wires connected to said bands and a bait holder arranged with the conductors.

3. The combination with a plurality of depending conductors so sized and spaced that an insect can simultaneously engage them, of a bait spear arranged within said conductors, and a receptacle suspended at the lower end of said bait spear.

In testimony whereof, I hereunto affix my signature.

HUGH ALEXANDER.